(12) United States Patent
Shimada et al.

(10) Patent No.: US 11,302,931 B2
(45) Date of Patent: Apr. 12, 2022

(54) METHOD OF MANUFACTURING SEPARATOR ASSEMBLY USED FOR FUEL CELL

(71) Applicant: NOK CORPORATION, Tokyo (JP)

(72) Inventors: Junichi Shimada, Kanagawa (JP); Hajime Yui, Kanagawa (JP); Shigeru Watanabe, Kanagawa (JP); Toshihiro Shimazoe, Kanagawa (JP)

(73) Assignee: NOK CORPORATION, Tokyo (JP)

( * ) Notice: Subject to any disclaimer, the term of this patent is extended or adjusted under 35 U.S.C. 154(b) by 0 days.

(21) Appl. No.: 17/128,713

(22) Filed: Dec. 21, 2020

(65) Prior Publication Data

US 2021/0194016 A1    Jun. 24, 2021

(30) Foreign Application Priority Data

Dec. 23, 2019    (JP) .............................. JP2019-231126

(51) Int. Cl.
*H01M 8/0206*    (2016.01)
*H01M 8/0286*    (2016.01)

(52) U.S. Cl.
CPC ....... *H01M 8/0206* (2013.01); *H01M 8/0286* (2013.01)

(58) Field of Classification Search
CPC .......................... H01M 8/0206; H01M 8/0286
See application file for complete search history.

(56) References Cited

U.S. PATENT DOCUMENTS

2007/0231619 A1* 10/2007 Strobel ............... H01M 8/0232
                                                            429/457

FOREIGN PATENT DOCUMENTS

JP          2017-139218          8/2017

* cited by examiner

*Primary Examiner* — Helen Oi K Conley
(74) *Attorney, Agent, or Firm* — Greenblum & Bernstein, P.L.C.

(57) ABSTRACT

A method of manufacturing a separator assembly for fuel cell includes a separator assembly forming step in which a separator assembly including a first metal separator and a second metal separator each having a protruding bead portion is formed by joining together the surfaces of the first and second metal separators opposite from their respective bead portions protruding, and a preload applying step in which a pair of platens apply a preload in a thickness direction of the separator assembly to a bead seal section formed of one pair of the bead portions, and thereby the bead seal section is plastically deformed. In the preload applying step, the preload applied to a linear portion of the bead seal section is set to be smaller than the preload applied to a curve portion of the bead seal section.

3 Claims, 8 Drawing Sheets

LINEAR PORTION
A–A

FIG. 4B

JOINT PORTION
B–B

FIG. 4C

CURVE PORTION
C–C

FIG. 5A

LINEAR PORTION
A-A

FIG. 5B

JOINT PORTION
B-B

FIG. 5C

CURVE PORTION
C-C

FIG. 6

⟨COMPARATIVE EXAMPLE⟩

FIG. 7

⟨EXAMPLE⟩

METHOD OF MANUFACTURING SEPARATOR ASSEMBLY USED FOR FUEL CELL

RELATED APPLICATION

This application claims benefit from Japanese application No. 2019-231126, filed Dec. 23, 2019, the disclosure of which is hereby incorporated by reference in its entirety.

BACKGROUND

Technical Field

The present disclosure relates to a method of manufacturing a separator assembly for fuel cell.

Description of the Related Art

There have been known fuel cells including separator assemblies. Such a separator assembly includes a protruding bead seal section. A pair of bead seal sections hold an electrolyte membrane or an electrolyte membrane of a membrane electrode assembly (MEA) from both sides, and thereby form a seal area for preventing leakage of reaction gas.

Figure 9:
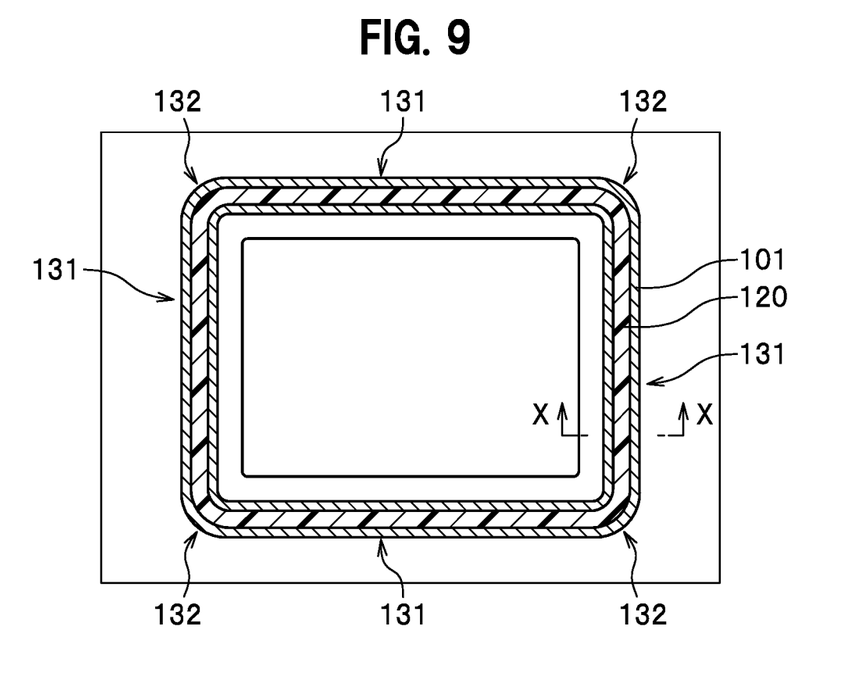
FIG. 9 is a schematic plan view illustrating an example of a bead seal section.
Figure 10:
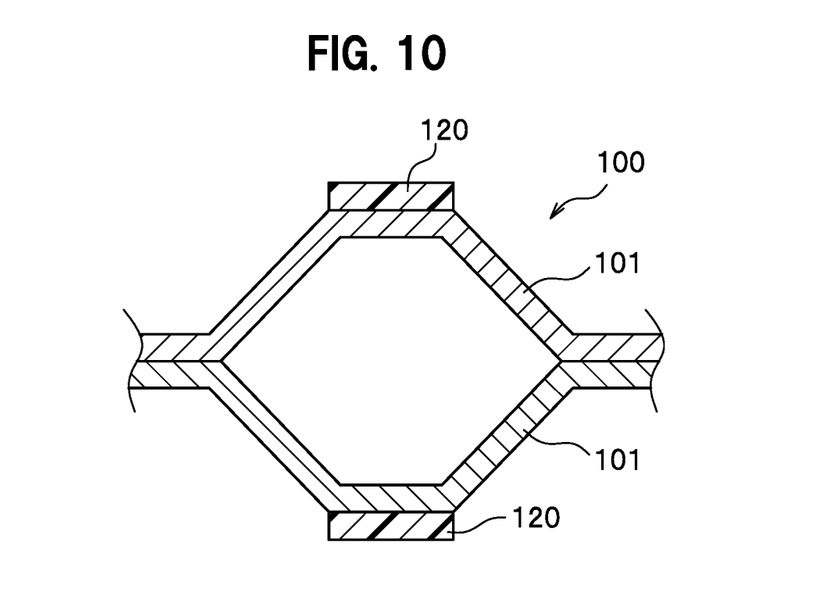
FIG. 10 is a cross-sectional view taken along X-X in FIG. 9.

Here, FIG. 9 is a schematic plan view illustrating an example of a bead seal section. FIG. 10 is a cross-sectional view taken along X-X in FIG. 9. As illustrated in FIG. 9, a bead seal section 100 has a rectangular shape in plan view, and forms a seal area along its circumferential direction. The bead seal section 100 includes four linear portions 131 and four curve portions 132 formed at corners. As illustrated in FIG. 10, the bead seal section 100 includes bead portions 101 and 101 protruding in opposite directions. Distal ends of the bead seal section 100 are provided with seal members 120 and 120 along an extending direction of the bead seal section 100.

Figure 11:
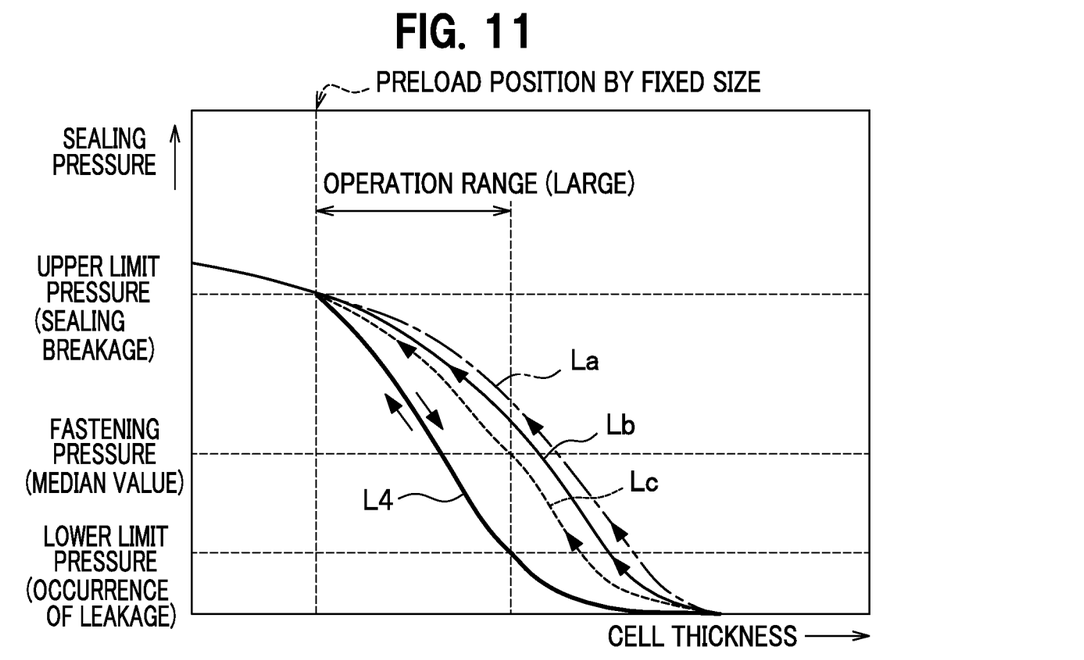
FIG. 11 is a graph presenting a relationship between a cell thickness and a sealing pressure in a fuel cell.

FIG. 11 is a graph presenting a relationship between a cell thickness and a sealing pressure in a fuel cell. For example, Japanese Patent Application Publication No. 2017-139218 discloses a technique of applying a preload to a bead seal section in advance because an influence of plastic deformation due to an external load is great in the bead seal section. A load characteristic line L4 represents conditions of a bead seal section with a preload having been applied thereto. As represented by the load characteristic line L4, the bead seal section with the preload having been applied thereto is not plastically deformed even if a load variation occurs due to disturbances (such as temperature change or collision) during operation of the fuel cell stack, and can move on the same load characteristic line L4 in both cases where a load is applied and where the load is removed. In other words, the application of the preload leads to an increase in the operation range, in which it is possible to obtain a wide range of load characteristics that can withstand disturbances and therefore obtain a desired sealing surface pressure. Here, in load characteristic lines La, Lb, and Lc in FIG. 11, operation ranges for maintaining a desired sealing surface pressure are narrow because of lack of the preload application.

Figure 12:
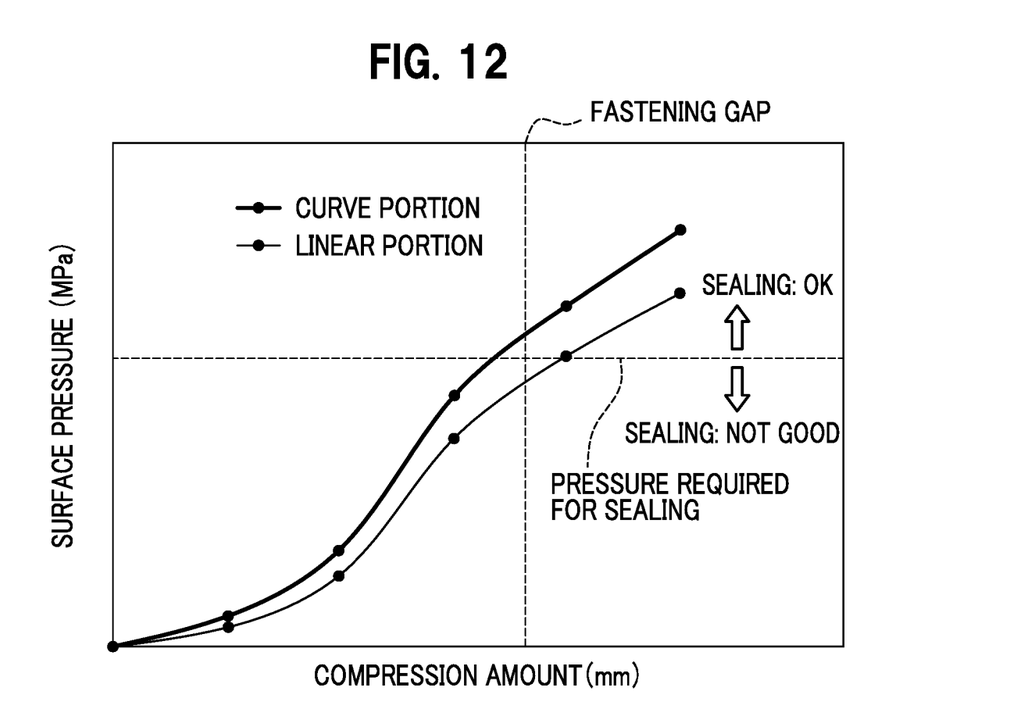
FIG. 12 is a graph presenting a relationship between a compression amount and a surface pressure of a bead seal section according to an example of the bead seal section.

A reaction force of the bead seal section 100 illustrated in FIGS. 9 and 10 is mainly determined by the cross-sectional shape, but is also affected by its planar shape (shape seen in an out-of-plane direction). Even if the bead seal section 100 has a uniform cross section, the bead height may vary between the linear portions 131 and the curve portions 132 because the amount of spring back after being applied the preload is different between the linear portions 131 and the curve portions 132. FIG. 12 is a graph presenting a relationship between a compression amount and a surface pressure of a bead seal section according to an example of the bead seal section. As presented in FIG. 12, even with the same compression amount, the surface pressure of the linear portions 131 is lower than that of the curve portions 132, and accordingly the bead reaction force may vary.

SUMMARY

The present disclosure was made in order to solve the aforementioned problem, and has an object to provide a method of manufacturing a separator assembly for fuel cell, which is capable of reducing a variation of surface pressure in a bead seal section of a separator assembly.

The present invention for solving the aforementioned problem includes a separator assembly forming step in which a separator assembly including a first metal separator and a second metal separator each having a protruding bead portion is formed by joining together the surfaces of the first and second metal separators opposite from their respective bead portions protruding, and a preload applying step in which a pair of platens apply a preload in a thickness direction of the separator assembly to a bead seal section formed of one pair of the bead portions, and thereby plastically deform the bead seal section. In the preload applying step, the preload applied to a linear portion of the bead seal section is set to be smaller than the preload applied to a curve portion of the bead seal section.

According to the above manufacturing method, a variation of height dimension between the linear portion and the curve portion of the bead seal section may be reduced. Thus, it is possible to reduce a variation of surface pressure in the bead seal section.

According to the method of manufacturing a separator assembly for fuel cell of the present invention, it is possible to reduce a variation of surface pressure in the bead seal section of the separator assembly.

DETAILED DESCRIPTION OF THE EMBODIMENTS

Figure 1:
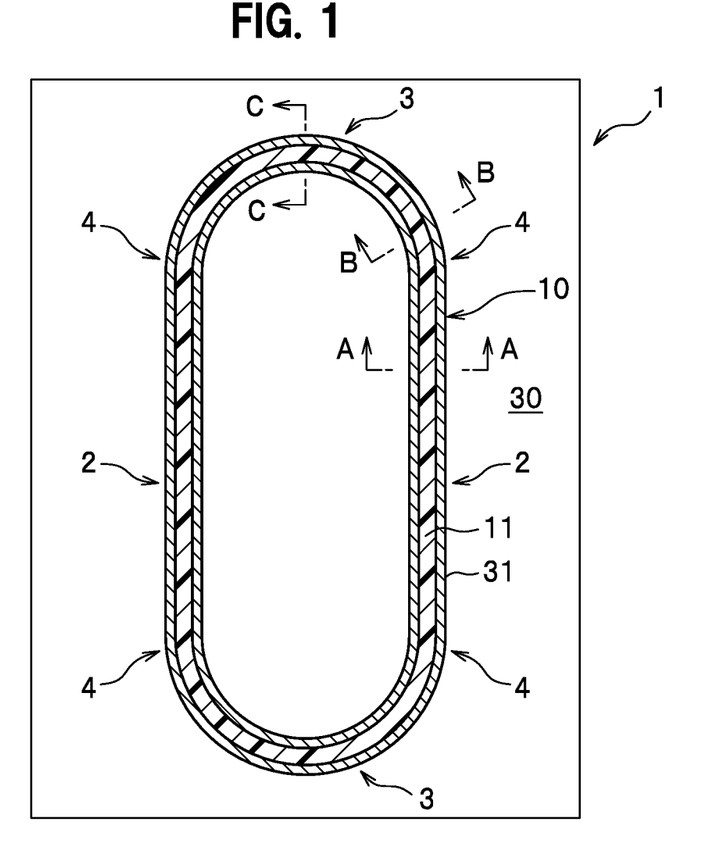
FIG. 1 is a plan view of a separator assembly for fuel cell according to an embodiment.

With reference to the accompanying drawings, description is given of a method of manufacturing a separator assembly for fuel cell and a separator assembly for fuel cell according to embodiments. As illustrated in FIG. 1, a separator assembly for fuel cell 1 according to an embodiment (hereinafter, also simply referred to as the "separator assembly") includes a bead seal section 10 and seal members 11. The bead seal section 10 includes linear portions 2 each having a linear shape, curve portions 3 each having a curved shape, and joint portions 4 between the linear portions 2 and the curve portions 3. The joint portion 4 is an approaching portion reaching the curve portion 3 and having a smaller curvature than the curve portion 3.

Figure 2:
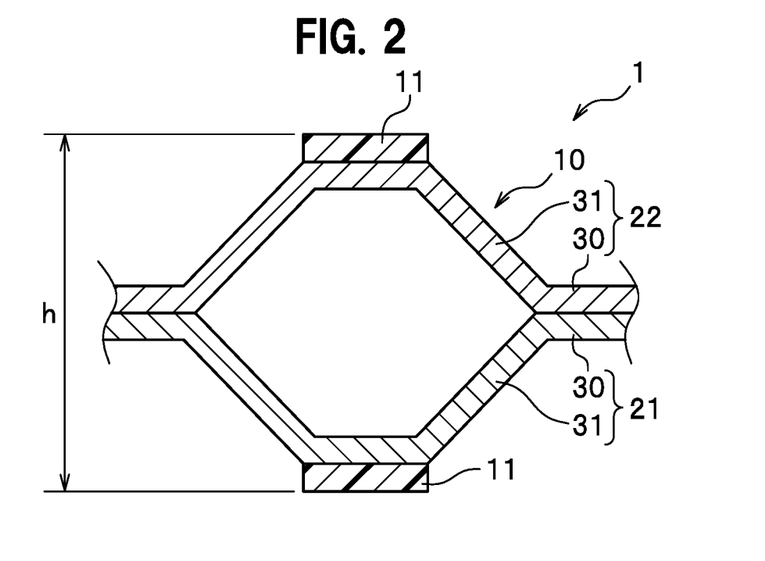
FIG. 2 is a cross-sectional view taken along A-A in FIG. 1.

As illustrated in FIG. 2, the bead seal section 10 is formed by joining a first metal separator 21 and a second metal separator 22 together. The first metal separator 21 and the second metal separator 22 have the same shape.

The first metal separator 21 includes flat base portions 30 and a protruding bead portion 31. The bead seal section 10 includes the bead portions 31 and 31 protruding in the opposite directions, and has a hollow cavity with a hexagonal cross section. The distal ends of the bead seal section 10 are provided with the respective seal members 11 along the extending direction of the bead seal section 10.

A method of manufacturing a separator assembly for fuel cell includes a separator forming step, a separator assembly forming step, and a preload applying step. In the preload applying step, a preload applied to the linear portions 2 of the bead seal section 10 is set to be lower than a preload applied to the curve portions 3. This setting makes it possible to reduce a height variation between the linear portions 2 and the curve portions 3 in the bead seal section 10, and accordingly reduce a variation of surface pressure in the extending direction of the bead seal section 10. Hereinafter, the embodiments are described in detail.

Embodiment

As illustrated in FIGS. 1 and 2, the separator assembly 1 is a separator for use in a fuel cell (not illustrated). The fuel cell is a member that generates power through chemical reaction between hydrogen (fuel gas) supplied from an anode side and oxygen (oxidant gas) supplied from a cathode side. A fuel cell stack is formed by stacking multiple fuel cells and compressing the adjacent fuel cells with a predetermined load.

An electrolyte membrane or an electrolyte membrane of a membrane electrode assembly (MEA) provided in a fuel cell is held between the bead seal sections 10 and 10 in a pair of separator assemblies 1 and 1, and thereby a seal area for preventing leakage of reaction gas such as the fuel gas and the oxidant gas is formed. In some cases, a portion held between a pair of separator assemblies 1 and 1 may be a resin film (resin flame member).

As illustrated in FIG. 1, the bead seal section 10 of the separator assembly 1 according to the present embodiment is formed as a closed loop in the circumferential direction. The planar shape of the bead seal section 10 is not particularly limited, but is an oval shape in the present embodiment. The bead seal section 10 includes two opposed linear portions 2, two opposed curve portions 3, and four joint portions 4 formed between the linear portions 2 and the curve portions 3.

Next, a method of manufacturing a fuel cell according to the present embodiment is described. The method of manufacturing a fuel cell includes a separator forming step, a separator assembly forming step, a platen preparing step, a preload applying step, an assembling step, and a compressing step. The method of manufacturing a separator assembly for fuel cell is included in the method of manufacturing a fuel cell.

The separator forming step is a step of forming the first metal separator 21 and the second metal separator 22 as illustrated in FIG. 2. The first metal separator 21 and the second metal separator 22 have the same shape and size. In the separator forming step, a flat metal thin plate (material) having a thickness of about 0.03 to 0.3 mm is press-formed to form the first metal separator 21 and the second metal separator 22. The first metal separator 21 includes flat base portions 30 and a single bead portion 31. The present embodiment is described herein as an example where the single bead portion 31 is provided. Instead, two or more bead portions 31 may be provided, or another bead portion having a different height may be provided in addition to the bead portion 31.

The separator assembly forming step is a step of forming the separator assembly. As illustrated in FIG. 2, opposite surfaces of the first metal separator 21 and the second metal separator 22 are surfaces opposite to surfaces located in the directions of their respective bead portions 31 protruding. In the separator assembly forming step, the opposite surfaces are joined together to form the separator assembly. The first metal separator 21 and the second metal separator 22 are united by brazing, swaging, welding, or the like.

The bead seal section 10 including the bead portions 31 and 31 has a hollow cavity. The seal members 11 and 11 are attached to the distal ends of the bead seal section 10 while being continuously extended in the extending direction of the bead seal section 10. The seal member 11 may be formed of an elastic material, and may use, for example, ethylene propylene diene rubber (EPDM), silicone rubber (VMQ), fluororubber (FKM), polyisobutylene (PIB), resin, or the like.

Figure 3:
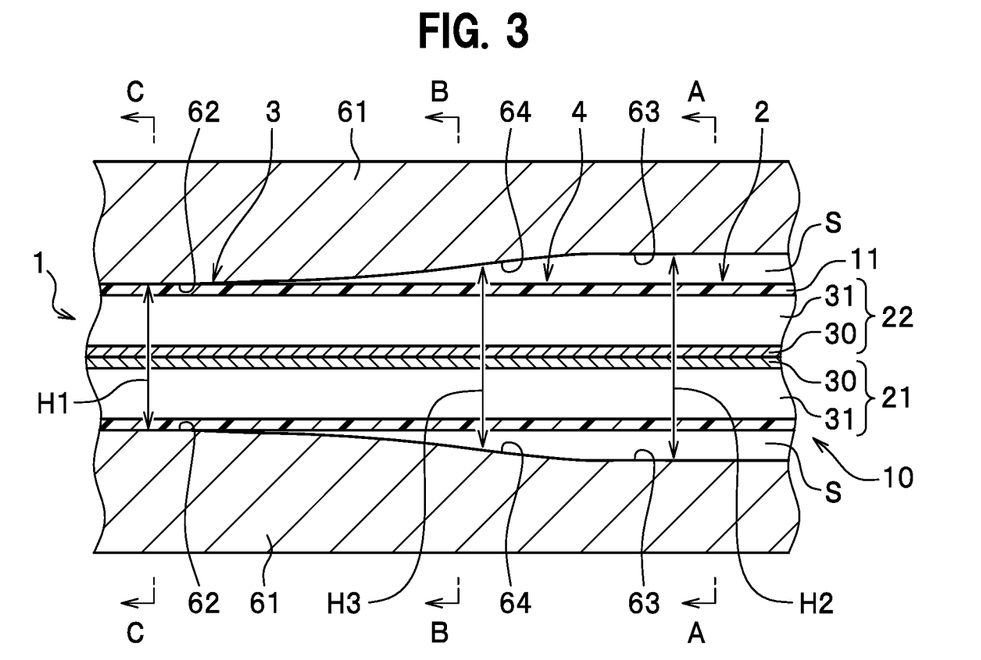
FIG. 3 is a cross-sectional view taken along a seal line illustrating a state immediately before a preload applying step of a method of manufacturing a separator assembly for fuel cell according to the embodiment.

The platen preparing step is a step of preparing platens 61 and 61 as illustrated in FIG. 3. The platens 61 are members that apply a preload to the separator assembly 1. The platens 61 are arranged in pair on both sides of the separator assembly 1 and are formed in the same shape and size. The platens 61 are formed of a high-strength metal or resin and have a plate-like shape. The platens 61 include datum portions 62, stepped portions 63, and slope portions 64 on their respective facing surfaces.

The datum portions 62 are datum surfaces of the platens 61, and are flat surfaces that come into contact with each other when the platens 61 and 61 are abutted (contacted) each other without sandwiching anything. Each of the stepped portions 63 is a flat surface formed at a position farther from the separator assembly 1 than the datum portion 62. When the platens 61 and 61 are abutted (contacted) each other, the stepped portions 63 and 63 are apart from each other.

Each of the slope portions 64 is an inclined surface formed between the datum portion 62 and the stepped portion 63. The slope portion 64 is inclined to become farther from the separator assembly 1 while extending in a direction away from the datum portion 62. When the platens 61 and 61 are abutted (contacted) each other, the slope portions 64 and 64 are apart from each other.

As illustrated in FIG. 3, H2>H3>H1 holds in a state where the separator assembly 1 is held between the platens 61 and 61 (no-load state), where H1 denotes the height dimension between the datum portions 62 and 62 facing each other, H2 denotes the height dimension between the stepped portions 63 and 63 facing each other, and H3 denotes the height dimension between the slope portions 64 and 64 facing each other.

Figure 4A:
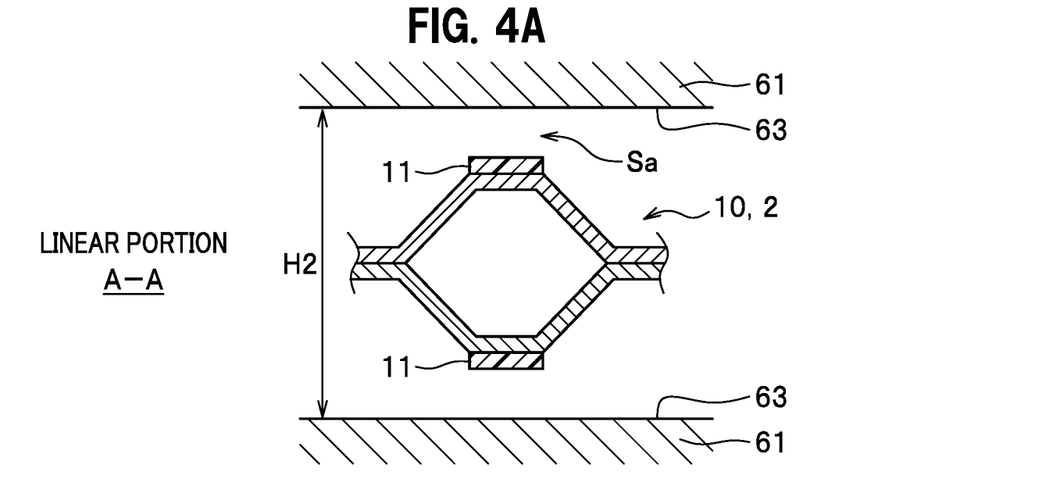
FIG. 4A is a cross-sectional view taken along A-A in FIG. 3 illustrating a state immediately before the preload applying step of the method of manufacturing a separator assembly for fuel cell according to the embodiment.
Figure 4B:
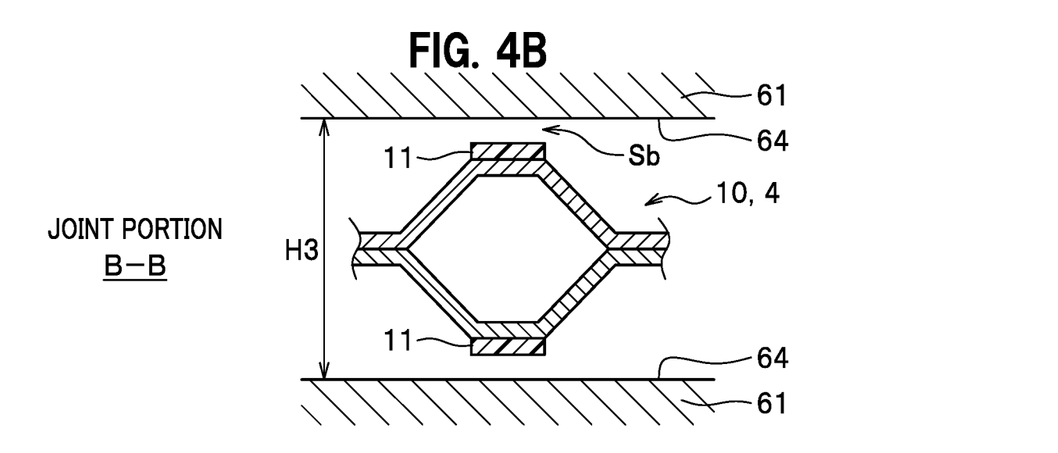
FIG. 4B is a cross-sectional view taken along B-B in FIG. 3 illustrating a state immediately before the preload applying step of the method of manufacturing a separator assembly for fuel cell according to the embodiment.
Figure 4C:
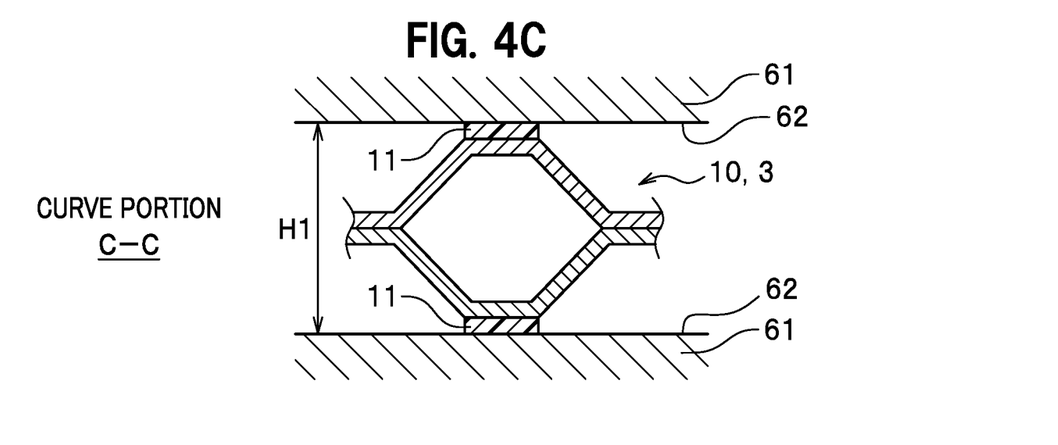
FIG. 4C is a cross-sectional view taken along C-C in FIG. 3 illustrating a state immediately before the preload applying step of the method of manufacturing a separator assembly for fuel cell according to the embodiment.
Figure 5A:
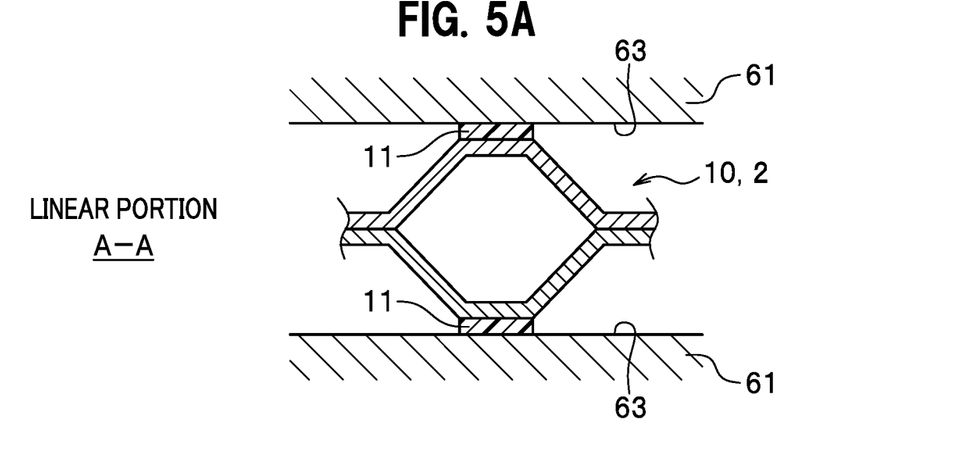
FIG. 5A is a cross-sectional view taken along A-A in FIG. 3 illustrating a state where a load is applied in the preload applying step of the method of manufacturing a separator assembly for fuel cell according to the embodiment.
Figure 5B:
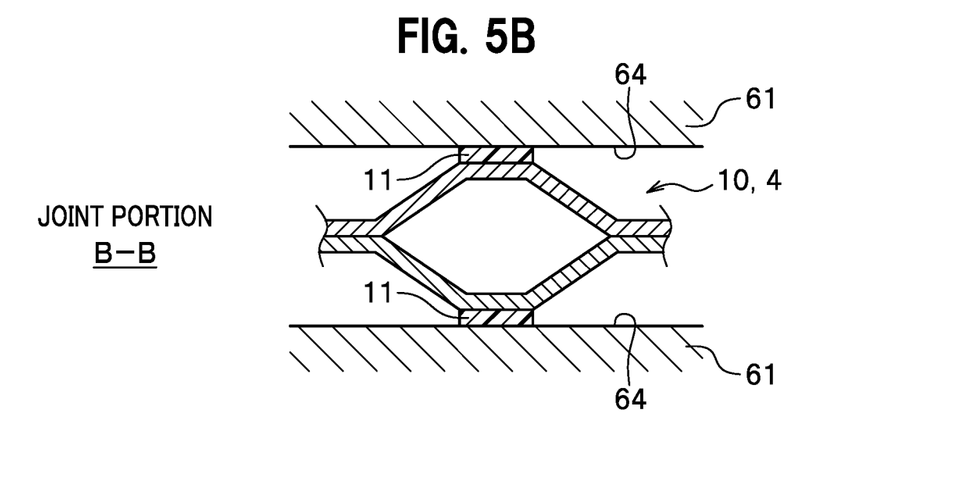
FIG. 5B is a cross-sectional view taken along B-B in FIG. 3 illustrating a state where a load is applied in the preload applying step of the method of manufacturing a separator assembly for fuel cell according to the embodiment.
Figure 5C:
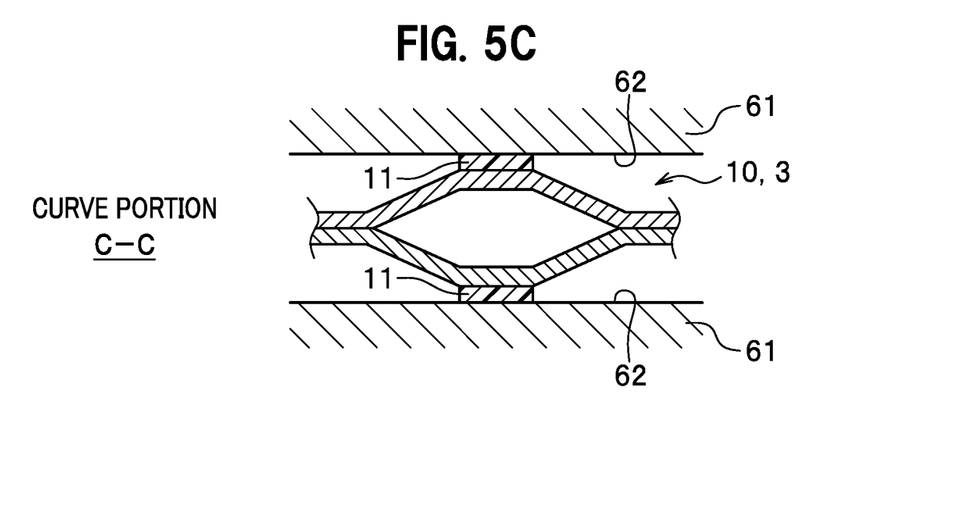
FIG. 5C is a cross-sectional view taken along C-C in FIG. 3 illustrating a state where a load is applied in the preload applying step of the method of manufacturing a separator assembly for fuel cell according to the embodiment.

The preload applying step is a step of applying a preload to the separator assembly 1 as illustrated in FIGS. 3, 4, and 5. In the preload applying step, the platens 61 and 61 are brought close to each other while maintaining the parallel state, thereby applying the load from both sides of the separator assembly 1 in a thickness direction. In this step, the bead seal section 10 is set such that the linear portions 2 face the stepped portions 63, the curve portions 3 face the datum portions 62, and the joint portions 4 face the slope portions 64. In this state, the platens 61 and 61 are brought close to each other to apply the load to the bead seal section 10, and thereby each of the portions are plastically deformed.

More specifically, as illustrated in FIG. 4A, the linear portions 2 of the bead seal section 10 and the stepped portions 63 of the platens 61 and 61 are apart from each other across a space Sa immediately before load application. Then, when the load is applied in the preload applying step, the linear portions 2 of the bead seal section 10 are compressed and plastically deformed with a predetermined load by the stepped portions 63 and 63 of the platens 61 and 61 as illustrated in FIG. 5A.

As illustrated in FIG. 4B, the joint portions 4 of the bead seal section 10 and the slope portions 64 of the platens 61 and 61 are apart from each other across a space Sb immediately before the load application. The space Sb is smaller than the space Sa. Then, when the load is applied in the preload applying step, the joint portions 4 of the bead seal section 10 are compressed and plastically deformed by the slope portions 64 and 64 of the platens 61 and 61 with a predetermined load as illustrated in FIG. 5B.

As illustrate in FIG. 4C, the curve portions 3 of the bead seal section 10 and the datum portions 62 of the platens 61 and 61 are abutted each other or face each other across a slight space immediately before the load application. Then, when the load is applied in the preload applying step, the curve portions 3 of the bead seal section 10 are compressed and plastically deformed by the datum portions 62 and 62 of the platens 61 and 61 with a predetermined load as illustrated in FIG. 5C.

As illustrated in FIGS. 5A, 5B, and 5C, the load applied to the bead seal section 10 varies because the datum portions 62, the stepped portions 63, and the slope portions 64 having different heights are formed on the facing surfaces of the platens 61 and 61. Specifically, the load applied to the bead seal section 10 becomes smaller in the order of the curve portions 3, the joint portions 4, and the linear portions 2. In other words, in the preload applying step, the preload applied to the linear portions 2 of the bead seal section 10 is set to be smaller than the preload applied to the curve portion 3. After the end of the preload applying step, the separator assembly 1 is released from the load by separating the platens 61 and 61. At this time, the height dimension h (see FIG. 2) of the bead seal section 10 is not constant in the extending direction of the bead seal section 10.

The assembling step is a step of forming a cell by holding an electrolyte membrane or membrane electrode assembly (not illustrated) between one pair of separator assemblies 1 and 1.

The compressing step is a step of forming a fuel cell stack by stacking multiple cells and applying a predetermined compressing load in the thickness direction of the cells. When the fuel cell stack is formed and a gap between the separator assemblies 1 and 1 facing each other becomes a predetermined fastening gap, the height dimension h of the bead seal section 10 (see FIG. 2) is constant or substantially constant along the circumferential direction.

Figure 6:
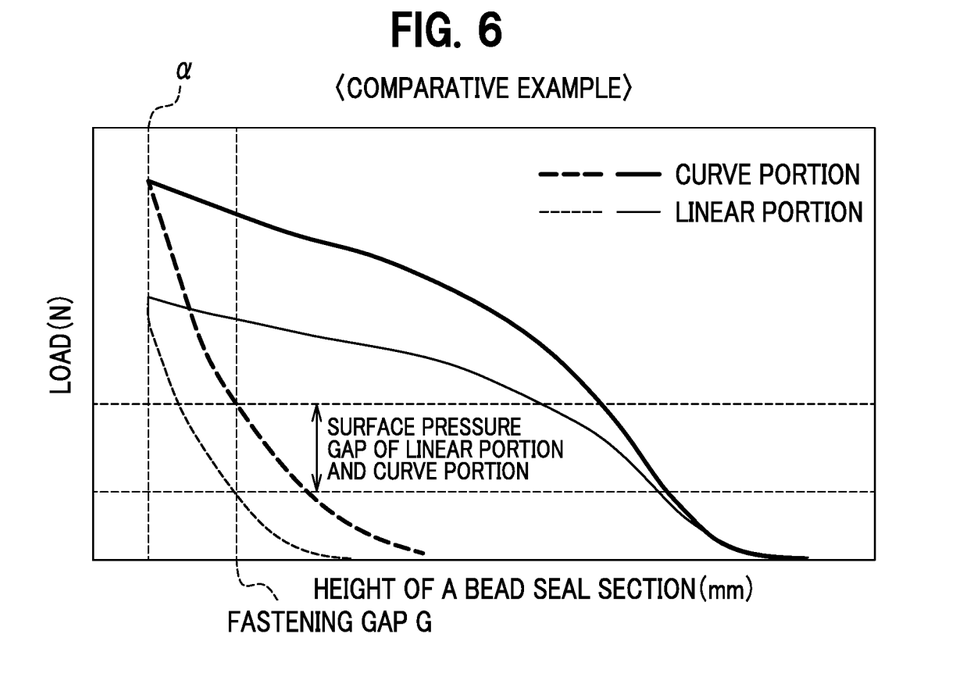
FIG. 6 is a graph presenting a relationship between the height of a bead seal section and a load according to a comparative example.

Next, operations and effects of the present embodiment are described. FIG. 6 is a graph presenting a relationship between the height of a bead seal section and a load according to a comparative example. The fastening gap G in FIG. 6 is the height of the bead seal section when assembled to form a fuel cell stack. In this comparative example, a pair of platens having flat facing surfaces (the height positions of the facing surfaces are constant) are prepared and used to apply a preload in the preload applying step.

In the case of the comparative example, even if a preload constant is applied to the bead seal section entirely in the circumferential direction, the height dimension of the bead seal section varies between the linear portions and the curve portions because the amount of spring back after applying the preload is different between the linear portions and the curve portions. A line pointed by a sign α in FIG. 6 indicates a distance between the platens of the comparative example in the preload applying step. With the fastening gap G in FIG. 6, a surface pressure gap occurs between the linear portions and the curve portions. In other words, the surface pressure varies in the extending direction of the bead seal section in the comparative example.

Figure 7:
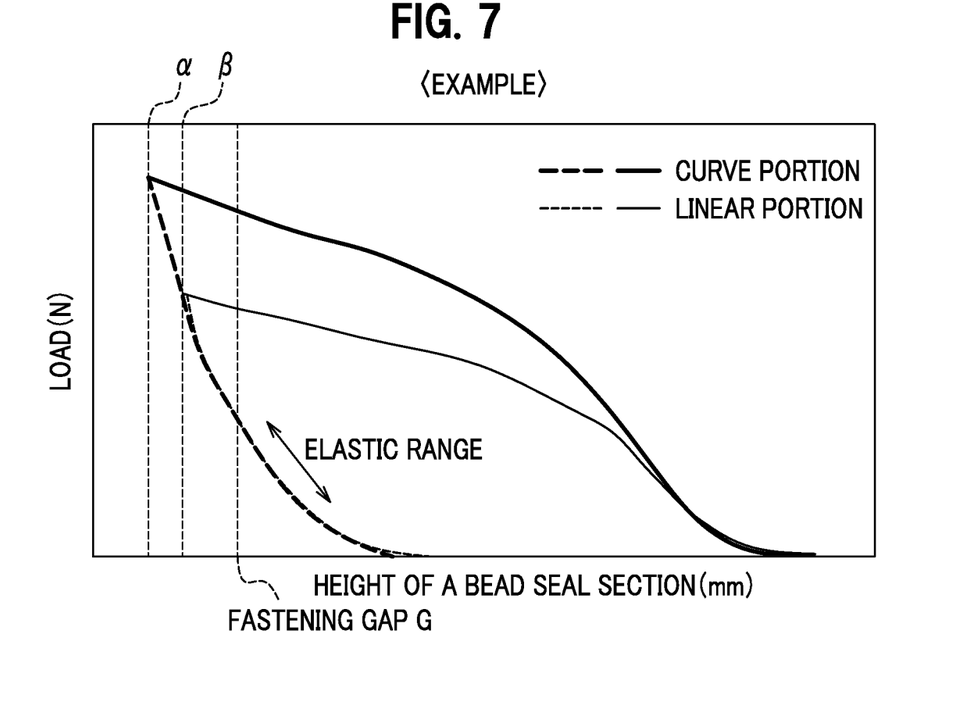
FIG. 7 is a graph presenting a relationship between the height of a bead seal section and a load according to the embodiment.

In contrast to this, in the present embodiment, the preload is applied by the platens 61 and 61 having the stepped portions 63 and 63, and therefore the preload applied to the linear portions 2 may be smaller than that of the curve portions 3. Thus, the linear portions 2 of the bead seal section 10 are prevented from having a reduced height dimension h when assembled to form a fuel cell stack. A line pointed by a sign β in FIG. 7 indicates a distance between the stepped portions 63 and 63 of the embodiment in the preload applying step (β>α). That is, by providing the stepped portions 63 to the platens 61, a pressing force may be varied among the portions, so that the height dimension of the bead seal section 10 may be controlled locally. Thus, a variation of the surface pressure of the bead seal section 10 may be reduced, and therefore the load acting on the bead seal section 10 may be equalized in the linear portions 2 and the curve portions 3 with the fastening gap G as illustrated in FIG. 7.

In addition, in the present embodiment, the platen 61 includes the slope portion 64 corresponding to the joint portion 4. Thus, buckling of the bead seal section 10 is less likely to occur at the joint portion 4 and therefore deterioration of the sealing performance may be prevented.

In addition, according to the separator assembly 1 of the present embodiment, the entire bead seal section 10 is plastically deformed in advance with the preload applied thereto. This leads to an increase in the operation range, in which it is possible to obtain a wide range of load characteristics that can withstand disturbances (such as temperature change or collision) and therefore obtain a desired sealing surface pressure.

Regarding a method of setting the height dimensions H1, H2, and H3 of the linear portions 2, the curve portions 3, and the joint portions 4, for example, a graph of load characteristics representing a relationship between the height of the bead seal section and the load is obtained by: forming platens including various stepped portions; and applying a preload to the separator assembly by using each pair of the platens. Then, as in the present embodiment, the stepped portion is determined such that the load applied to the bead seal section may be equalized or approximately equalized in the linear portions 2 and the curve portions 3 with the fastening gap G. Moreover, the stepped portion and the slope portion are determined such that the load applied to the bead seal section may be equalized or approximately equalized in the linear portions 2, the curve portions 3, and the joint portions 4 with the fastening gap G.

Embodiment 2

Figure 8:
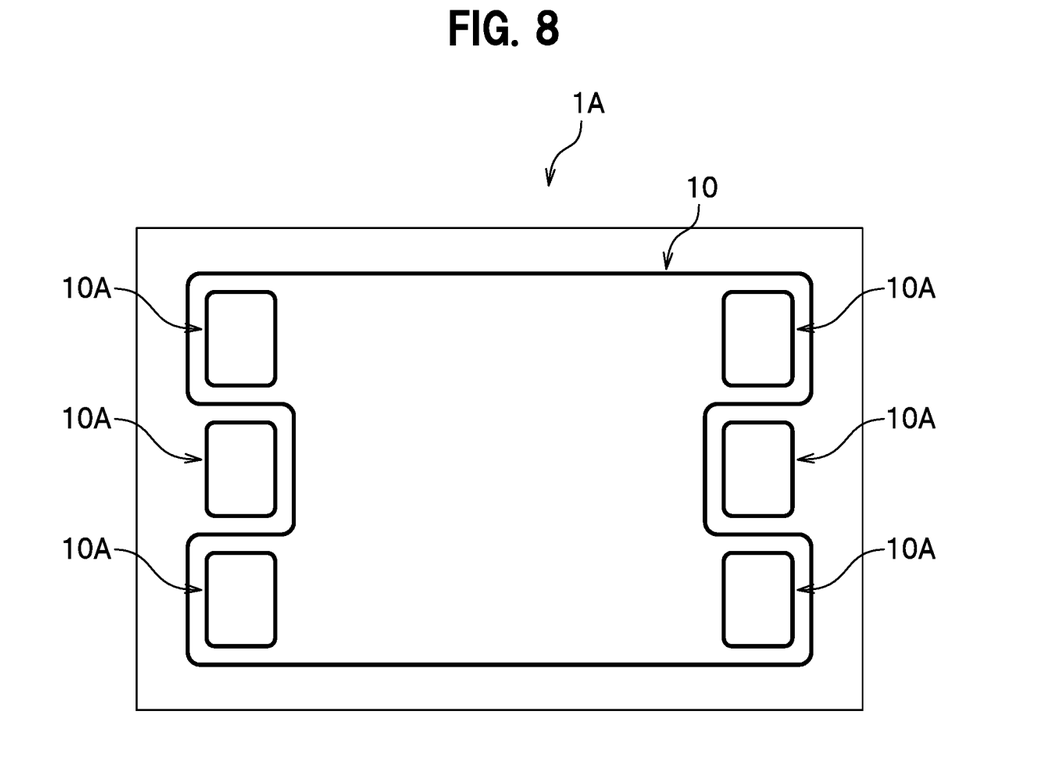
FIG. 8 is a plan view of a separator assembly according to a modification example.

Next, description is given of a method of manufacturing a separator assembly for fuel cell and a separator assembly for fuel cell according to Embodiment 2. FIG. 8 is a plan view of a separator assembly according to a modification example. As illustrated in FIG. 8, a separator assembly 1A according to the modification example includes bead seal sections 10A each of which seals a reaction gas manifold or a coolant manifold in addition to the bead seal section 10. As in the separator assembly 1A, multiple bead seal sections 10 and 10A may be provided. Then, the bead seal sections 10 and 10A may have a cross section in the same shape or different cross sections.

In the method of manufacturing a separator assembly for fuel cell according to the modification example, the steps are performed in the same way as in the above embodiment. In this manufacturing, the height dimensions of the stepped portions and the slope portions of the platens may be set as appropriate depending on each of the bead seal section 10 and the bead seal sections 10A.

The embodiment and the modification example have been described above but may be altered in design as appropriate. For example, the seal members 11 may be omitted.

What is claimed is:

1. A method of manufacturing a separator assembly used for a fuel cell comprising:
   providing a first metal separator and a second metal separator each having a protruding bead portion, wherein the first metal separator and the second metal separator each have an opposite surface opposite to a surface located in the directions of their respective protruding bead portions;
   forming a separator assembly by joining the opposite surface of the first metal separator and the opposite surface of the second metal separator to form a bead seal section including the bead portion of the first metal separator and the bead portion of the second metal separator in which the bead seal section includes a linear portion and a curve portion; and
   applying a preload to the bead seal section by a pair of platens in a thickness direction of the separator assembly, and plastically deform the bead seal section, wherein
   a preload applied to the linear portion of the bead seal section is set to be smaller than a preload applied to the curve portion of the bead seal section.

2. The method of manufacturing a separator assembly used for a fuel cell according to claim 1 wherein,
   the platens have facing surfaces facing each other respectively,
   each platen of the pair of platens includes a datum portion and a stepped portion on a facing surface of each platen, the stepped portion being located farther from the separator assembly than the datum portion, and
   the preload is applied to the bead seal section while locating the curve portion and the linear portion of the separator assembly so that the curve portion faces the datum portion and the linear portion faces the stepped portion.

3. The method of manufacturing a separator assembly used for a fuel cell according to claim 2 wherein,
   the facing surface of the each platen includes a slope portion located between the datum portion and the stepped portion, and
   the preload is applied to the bead seal section while locating the curve portion of the bead seal section and a joint portion of the linear portion so that the curve portion and the joint portion face the slope portion.

* * * * *